(12) United States Patent
Arledge

(10) Patent No.: US 11,966,918 B1
(45) Date of Patent: Apr. 23, 2024

(54) MEDICAL REIMBURSEMENT SYSTEM BASED UPON APPOINTMENT VALIDATION AND RELATED METHODS

(71) Applicant: Inmar Rx Solutions, Inc., Ft. Worth, TX (US)

(72) Inventor: Ryan Arledge, Kalamazoo, MI (US)

(73) Assignee: INMAR RX SOLUTIONS, INC., Ft. Worth, TX (US)

( * ) Notice: Subject to any disclaimer, the term of this patent is extended or adjusted under 35 U.S.C. 154(b) by 223 days.

(21) Appl. No.: 17/531,205

(22) Filed: Nov. 19, 2021

(51) Int. Cl.
*G06Q 20/40* (2012.01)
*G06Q 40/08* (2012.01)

(52) U.S. Cl.
CPC ............. *G06Q 20/40* (2013.01); *G06Q 40/08* (2013.01)

(58) Field of Classification Search
None
See application file for complete search history.

(56) References Cited

U.S. PATENT DOCUMENTS

| 9,449,347 B2 | 9/2016 | Schloter et al. |
| 2007/0150137 A1 | 6/2007 | Graham |
| 2017/0124526 A1* | 5/2017 | Sanderford ............ G16H 10/60 |
| 2017/0337634 A1* | 11/2017 | Ehrlich .................. H04L 67/52 |

* cited by examiner

Primary Examiner — David P Sharvin
(74) Attorney, Agent, or Firm — ALLEN, DYER, DOPPELT, + GILCHRIST, P.A.

(57) ABSTRACT

A medical reimbursement system may include a user device to obtain an actual medical appointment location and an actual medical appointment time for a user medical appointment. The system may also include a medical reimbursement processing server to obtain a scheduled medical appointment location and a scheduled medical appointment time for the user medical appointment, and obtain the actual medical appointment location and the actual medical appointment time from the user device. The server may validate whether the actual medical appointment location matches the scheduled medical appointment location and whether the actual medical appointment time matches the scheduled medical appointment time. The server may also, when the actual medical appointment time matches the scheduled medical appointment time, determine a distance traveled by the user related to the user medical appointment, calculate a travel distance reimbursement based upon the distance traveled, and process travel payment based upon the travel distance reimbursement.

20 Claims, 6 Drawing Sheets

US 11,966,918 B1

MEDICAL REIMBURSEMENT SYSTEM BASED UPON APPOINTMENT VALIDATION AND RELATED METHODS

TECHNICAL FIELD

The present invention relates to the field of payment processing, and, more particularly, to medical payment reimbursement and related methods.

BACKGROUND

One type of reimbursable expense is a vehicle mileage or vehicle distance traveled reimbursement. For example, a user may be reimbursed for mileage traveled for business. The mileage reimbursement is typically provided to offset costs associated with driving for the business, such as, for example, fuel, tolls, and usage of the user's personal vehicle.

Mileage may also be reimbursable when the purpose of the travel or driving is medically related. For example, under certain government programs, such as Medicaid, a user may obtain a mileage reimbursement for providing transportation, for example, to a person that cannot drive or reasonably be capable of transporting themselves to the medical appointment. With respect to Medicaid, for example, the user may obtain the reimbursement only after obtaining a proper authorization from a plan administrator. To obtain the proper authorization, the user typically contacts the plan administrator for a trip identifier, and then manually, for example, via a handwritten form, logs the travel distance to the medical appointment. The form is signed or validated by a healthcare provider and sent back to the plan administrator for validation and processing of the reimbursement payment. Similar mileage reimbursement programs may also be provided by other medical insurance plans, whether government sponsored plans or private plans.

SUMMARY

A medical reimbursement system may include a user device configured to obtain an actual medical appointment location and an actual medical appointment time for a user medical appointment. The medical reimbursement system may also include a medical reimbursement processing server configured to obtain a scheduled medical appointment location and a scheduled medical appointment time for the user medical appointment, and obtain the actual medical appointment location and the actual medical appointment time from the user device. The medical reimbursement processing server may also be configured to validate whether the actual medical appointment location matches the scheduled medical appointment location and whether the actual medical appointment time matches the scheduled medical appointment time.

The medical reimbursement processing server may also be configured to, when the actual medical appointment location matches the scheduled medical appointment location and when the actual medical appointment time matches the scheduled medical appointment time, determine a distance traveled by the user related to the user medical appointment, calculate a travel distance reimbursement for the user based upon the distance traveled, and process travel payment to the user based upon the travel distance reimbursement.

The medical reimbursement processing server is configured to obtain the actual medical appointment location based upon image data from the user device. The image data may be based upon a quick response (QR) code, for example.

The medical reimbursement processing server may be configured to obtain the actual medical appointment location as data via the user device and from a wireless device at the actual medical appointment location. The medical reimbursement processing server may be configured to obtain an address of the user to calculate the distance traveled by the user related to the user medical appointment, for example.

The medical reimbursement processing server may be configured to obtain geographic position data from the user device to calculate the distance traveled by the user related to the user medical appointment, for example. The medical reimbursement processing server may be configured to obtain a medical insurance claim for the medical appointment including the scheduled medical appointment location and the scheduled medical appointment time.

The medical reimbursement processing server may be configured to process travel payment by cooperating with a payment processing server. The user device may include a mobile wireless device comprising a housing, a wireless transceiver carried by the housing, a camera carried by the housing, a display carried by the housing, and a controller carried by the housing and coupled to the wireless transceiver, camera and display, for example.

A method aspect is directed to a method of processing a medical reimbursement. The method may include using a medical reimbursement processing server to obtain a scheduled medical appointment location and a scheduled medical appointment time for the user medical appointment, and obtain the actual medical appointment location and the actual medical appointment time from the user device. The method may also include using the medical reimbursement processing server to validate whether the actual medical appointment location matches the scheduled medical appointment location and whether the actual medical appointment time matches the scheduled medical appointment time, and when so, determine a distance traveled by the user related to the user medical appointment, calculate a travel distance reimbursement for the user based upon the distance traveled, and process travel payment to the user based upon the travel distance reimbursement.

A computer readable medium aspect is directed to a non-transitory computer readable medium for processing a medical reimbursement. The non-transitory computer readable medium includes computer executable instructions that when executed by a processor cause the processor to perform operations. The operations may include obtaining a scheduled medical appointment location and a scheduled medical appointment time for a user medical appointment, and obtaining an actual medical appointment location and an actual medical appointment time from a user device. The operations may further include validating whether the actual medical appointment location matches the scheduled medical appointment location and whether the actual medical appointment time matches the scheduled medical appointment time, and when so, determining a distance traveled by the user related to the user medical appointment, calculating a travel distance reimbursement for the user based upon the distance traveled, and processing travel payment to the user based upon the travel distance reimbursement.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments. Prime and multiple prime notations are used to refer to like elements in different embodiments.

Figure 1:
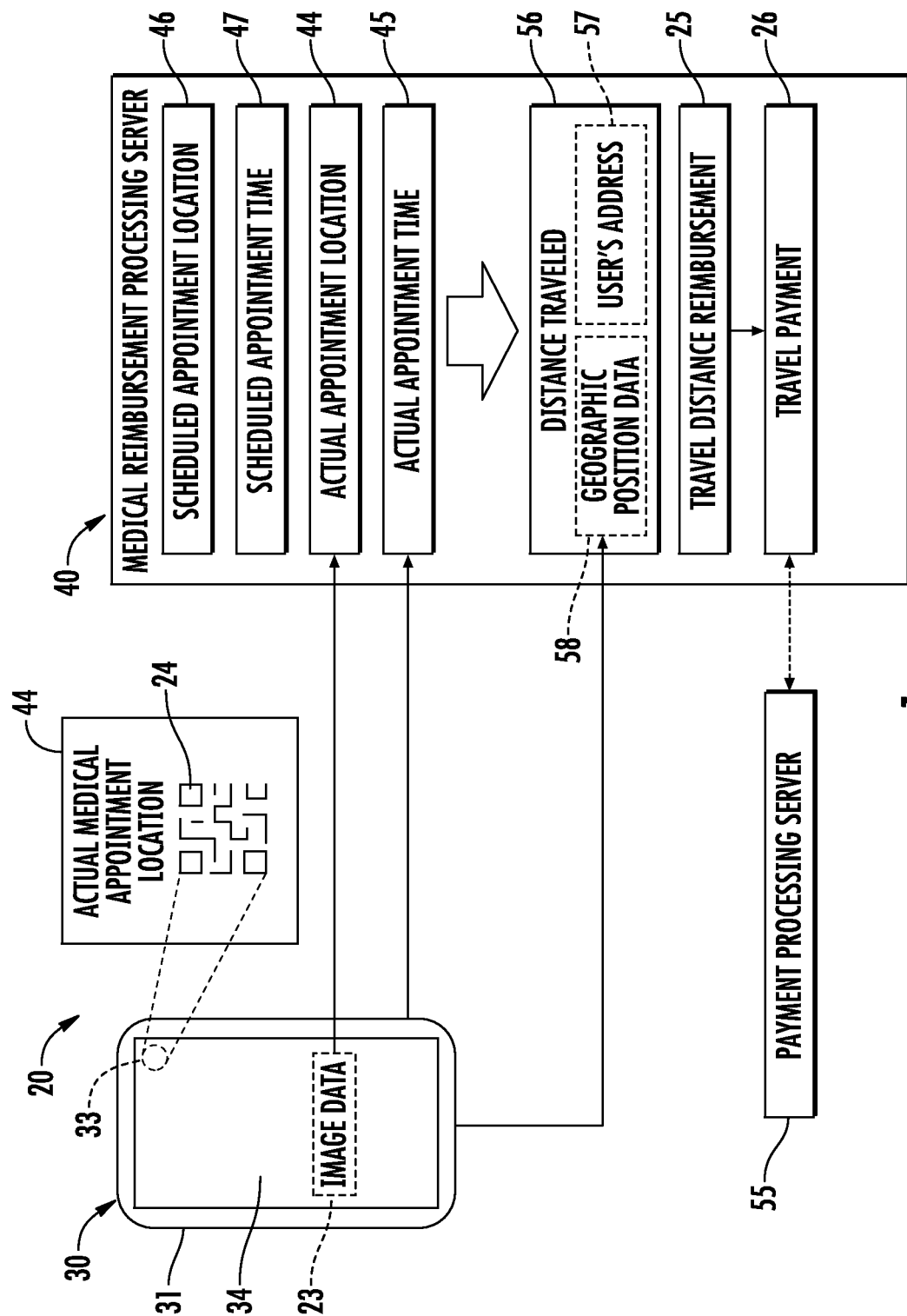
FIG. 1 is a schematic block diagram of a medical reimbursement system in accordance with an embodiment.
Figure 2:
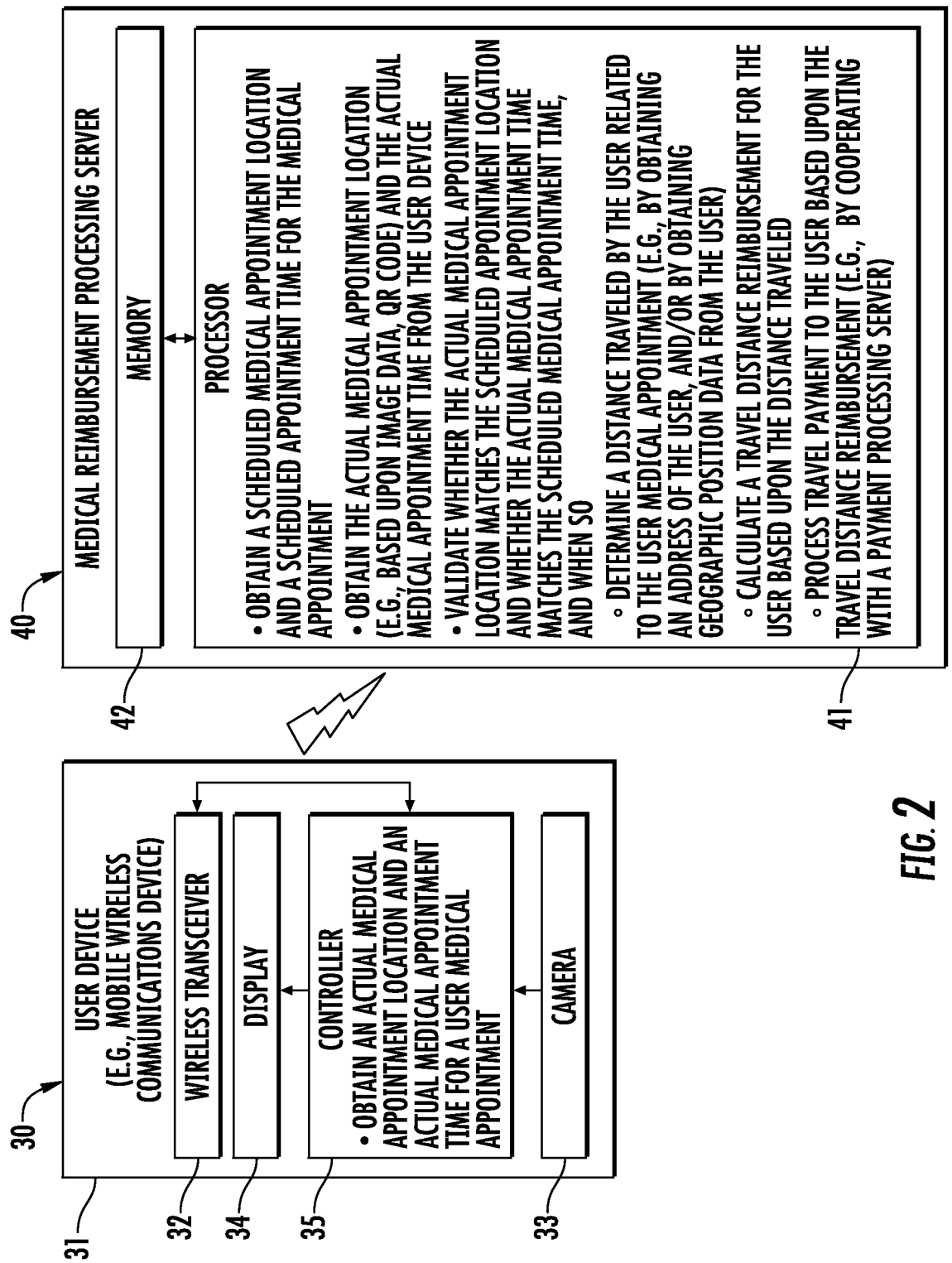
FIG. 2 is a schematic block diagram of the medical reimbursement system of FIG. 1.

Referring initially to FIGS. 1 and 2, a medical reimbursement system 20 includes a user device 30. The user device 30 is illustratively in the form of a mobile wireless communications device, for example, a mobile phone. The user device 30 may be another type of device, for example, a tablet computer or wearable device, for example. The user device 30 includes a housing 31 and a wireless transceiver 32 carried by the housing. The wireless transceiver 32 may operate for cellular communication, WiFi communication, near-field communication (NFC), and/or radio frequency tag circuitry (e.g., RFID), for example.

The user device 30 also includes a camera 33 and a display 34 carried by the housing 31. The display may be touch display, for example. The user device 30 also includes a controller 35 carried by the housing 31 and coupled to the wireless transceiver 32, the camera 33, and the display 34.

The controller 35 obtains an actual medical appointment location 44 and an actual medical appointment time 45 for a user medical appointment. More particularly, the controller 35 cooperates with the camera 33 to obtain image data 23, for example, from a quick response (QR) code 24. A different QR code 24 may be associated with different appointment locations. In an exemplary implementation, a given user may operate the user device 30 so that the camera 33 captures or scans the QR code at the actual medical appointment location 44, such as, for example, a medical professional's office, when arriving at the office or location for an appointment. The controller 35 may associate a current time to the time when the image data is obtained, or scanning of the QR code 24 (i.e., timestamp the image data).

The medical reimbursement system 20 also includes a medical reimbursement processing server 40. The medical reimbursement processing server 40 includes a processor 41 and an associated memory 42. While operations of the medical reimbursement processing server 40 are described herein, it should be understood that the processor 41 and the memory 42 cooperate to perform the operations.

Figure 3:
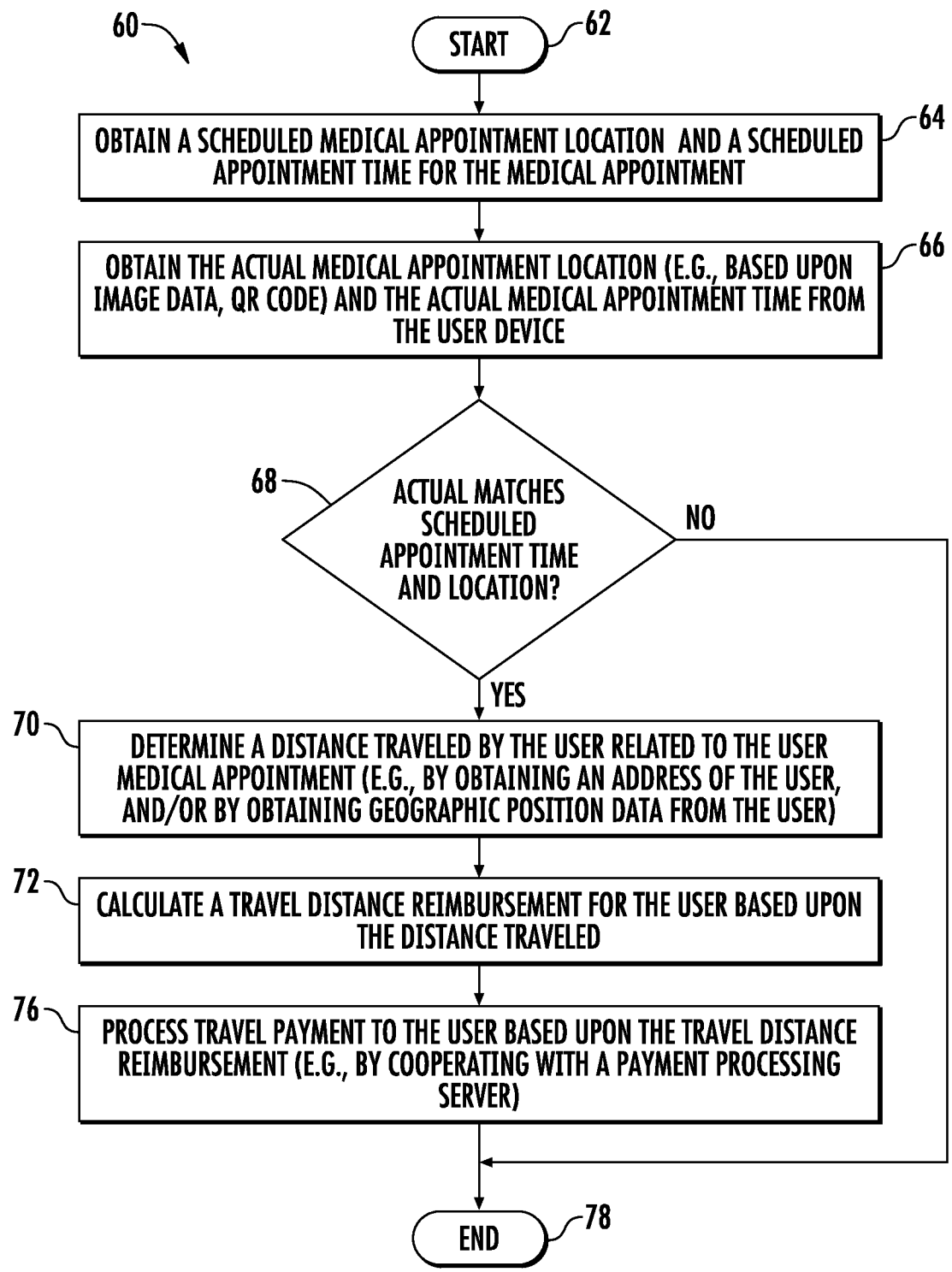
FIG. 3 is a flow diagram illustrating operation of the medical reimbursement server of FIG. 2.

Referring now to the flowchart 60 in FIG. 3, beginning at Block 62, operations of the medical reimbursement processing server will now be described. At Block 64, the medical reimbursement processing server 40 obtains a scheduled medical appointment location 46 and a scheduled medical appointment time 47 for the user medical appointment. The medical reimbursement processing server 40 may cooperate with one or more remote servers or databases, for example, associated with a healthcare system or organization, to retrieve the scheduled medical appointment location 46 and the scheduled medical appointment time 47 for the medical appointment for the given user. The medical reimbursement processing server 40 may retrieve the scheduled medical appointment location 46 and the scheduled medical appointment time 47 for the medical appointment for the given user based upon the given user's name or other user identifier, for example.

The medical reimbursement processing server 40 obtains the actual medical appointment location 44 and the actual medical appointment time 45 from the user device 30 (Block 66). More particularly, the user device 40 may communicate the obtained actual medical appointment location 44 and the actual medical appointment time 45, for example, wirelessly, to the medical reimbursement processing server 40.

The medical reimbursement processing server 40, at Block 68, validates whether the actual medical appointment location 44 matches the scheduled medical appointment location 46, and whether the actual medical appointment time 45 matches the scheduled medical appointment time 47. The medical reimbursement processing server 40 may validate the actual medical appointment time 44 to the scheduled medical appointment time 46 as a match when the actual medical appointment time matches to within a threshold of the scheduled medical appointment time, for example, +/−30 minutes.

The medical reimbursement processing server 40 may validate the actual medical appointment location 44 to the scheduled medical appointment location 46 based upon a match in addresses or unique location identifiers (e.g., communicated via the image data or QR code 24). In some embodiments, validation of the medical appointment location may also be based upon a comparison of the geographic position system (GPS) coordinates obtained from the user device 30 relative to the GPS coordinates of the medical location (e.g., to within a threshold and/or obtained via the image data or QR code 24).

When, at Block 68, medical reimbursement processing server 40 validates whether the actual medical appointment location 44 matches the scheduled medical appointment location 46, and whether the actual medical appointment time 45 matches the scheduled medical appointment time 47, the medical reimbursement processing server determines a distance traveled 56 by the user related to the user medical appointment (Block 70).

The medical reimbursement processing server 40 may determine the distance traveled by obtaining the address of the user 57 and calculating distance based upon the address. More particularly, based upon the user's name, the medical reimbursement processing server 40 may lookup (e.g., via a remote server, such as, for example, a server associated with the medical appointment or healthcare provider) the user's address and calculate, for example, using a geographic information system or mapping system, a vehicle driving distance from the user's address to the actual scheduled medical appointment location 44. In some embodiments, postal codes of the user and actual medical appointment location 44 may be used to determine the distance traveled 56. The user's address 57 may be obtained from the user device 30, for example, based upon the address being stored in the user device as the user's address.

Alternatively or additionally, the medical reimbursement processing server 40 may obtain geographic position data 58 from the user device 30 (e.g., obtained from a GPS receiver, triangulation, network identifier, etc.), to calculate the distance traveled by the user related to the user medical appointment. Based upon the geographic position data 58, the medical reimbursement processing server 40 may track movement or travel of the user device 30, for example, from a starting address to the actual medical appointment location 44. This technique for calculating the distance traveled 56 by the user may be more accurate, as the user's path of travel can be tracked to a specific route and/or roads to thus obtain a more accurate distance traveled. Of course, other and/or additional techniques may be used to determine or calculate the distance traveled by the given user.

Also, when the medical reimbursement processing server validates the actual and scheduled medical appointment locations and times, the medical reimbursement processing server calculates a travel distance reimbursement 25 for the user based upon the distance traveled (Block 72). The medical reimbursement processing server 40 may calculate the travel distance reimbursement for the user based upon a per-mile rate, for example. Such rates may be set based upon governmental entities for specific travel reasons, such as medical. For example, a reimbursement rate may be $0.16 per mile with the travel distance reimbursement being the product of the reimbursement rate and the distance traveled.

At Block 76, also when the medical reimbursement processing server 40 validates the actual and scheduled medical appointment locations and times at Block 68, the medical reimbursement processing server 40 processes a travel payment 26 to the user based upon the travel distance reimbursement 25. For example, the medical reimbursement processing server 40 may cooperate with a payment processing server 55 to process the travel payment 26. In other words, the travel payment 26 is handled by a third party payment processor that may be provide payment by way of direct deposit or ETF, provide a credit to a payment card (e.g., EBT or EBT-like card), and/or provide a credit to a digital wallet associated with the given user. Of course, the travel payment 26 may be processed and delivered to the given user using other techniques and/or the medical reimbursement processing server 40 may process the travel payment without a payment processing server 55. Operations end at Block 78.

Figure 4:
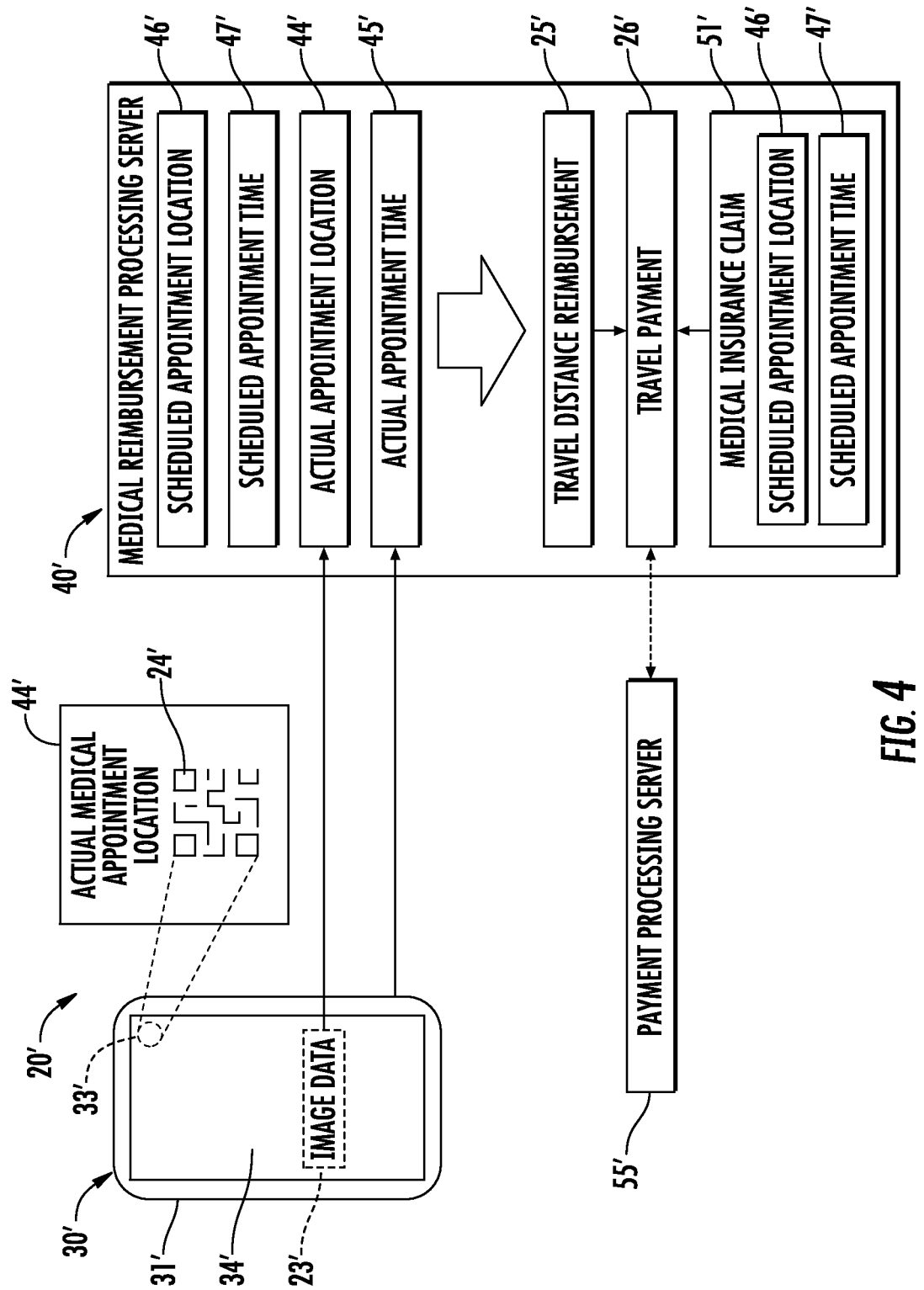
FIG. 4 is a schematic block diagram of a medical reimbursement system in accordance with another embodiment.
Figure 5:
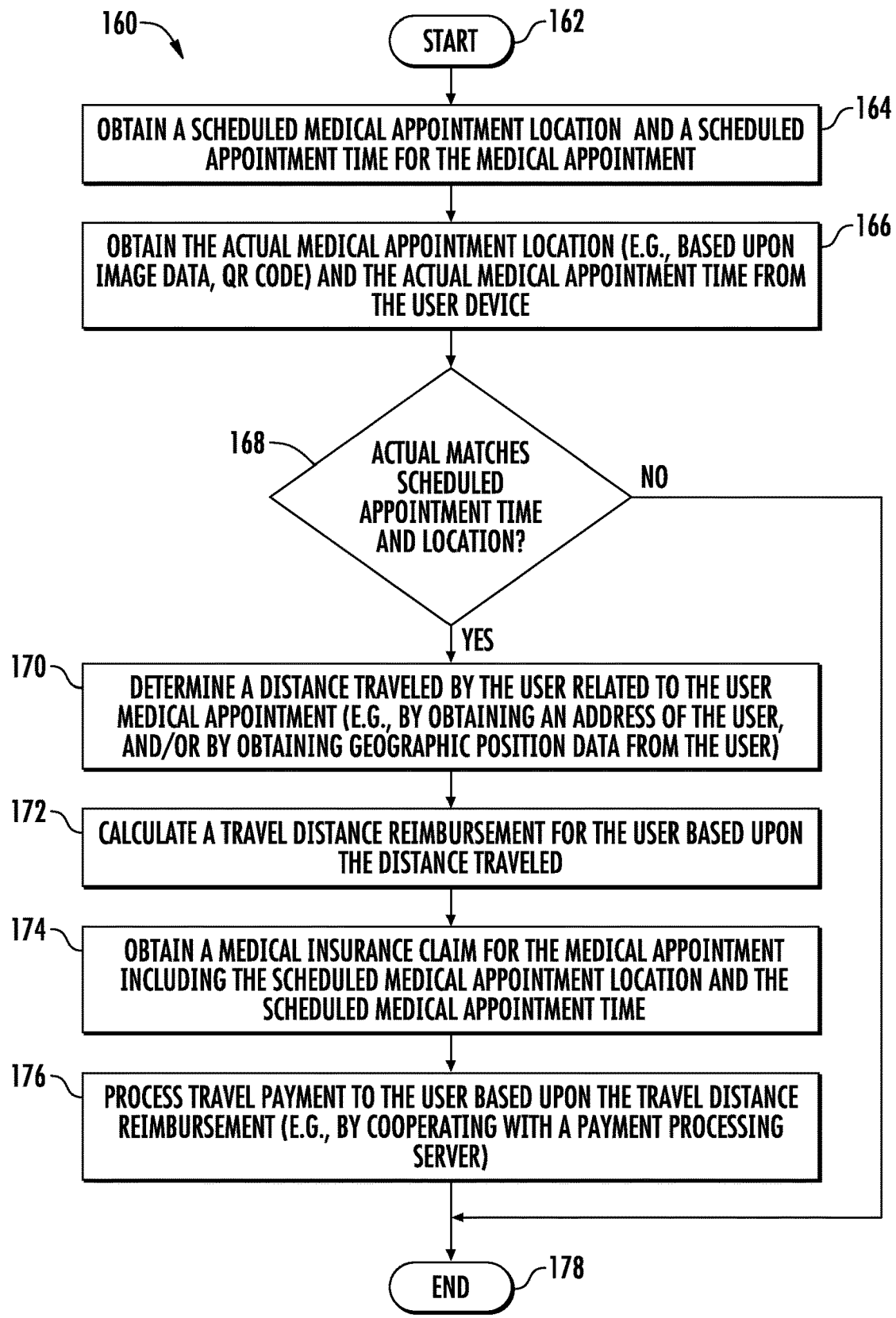
FIG. 5 is a flow diagram illustrating operation of the medical reimbursement server of FIG. 4.

Referring now to FIG. 4, and the flowchart 160 in FIG. beginning at Block 162, in another embodiment, the medical reimbursement processing server 40' may, as part of the validation (Block 168) or as a prerequisite to processing the travel payment, obtain a medical insurance claim 51' or information associated with the medical insurance claim (Block 174). The medical reimbursement processing server 40' may obtain the medical insurance claims from a claims processing server, for example, associated with an insurance company, or from the healthcare provider system (e.g., once the healthcare provider makes a claim). The medical insurance claim 51' may include the scheduled medical appointment location 46' and the scheduled medical appointment time 47'. At Block 176, the medical reimbursement processing server 40' may process the travel payment 26' to the user based upon the travel distance reimbursement 25' and upon the medical insurance claim 51' being made that includes information matching the user medical appointment.

Alternatively or additionally, the medical reimbursement processing server 40' may base the validation (Block 168) also upon matching to a corresponding medical insurance claim. Those skilled in the art will appreciate that the data obtained with respect to the scheduled and actual medical appointment locations and times 44'-47' may be stored for a threshold time period until the medical insurance claim may be obtained, at which time the travel payment 26' may be made. Elements illustrated, but not specifically described with respect to the present embodiments, for example, the user device including the housing 31', the display 34', and camera 33', the image data, the actual appointment time and location 44', the QR code 23', and the payment processing server 55' are similar to like elements described above. Moreover, operations illustrated in other blocks, such as, for example, Blocks 164-176 are similar to Blocks 64-76. Operations end at Block 178.

Figure 6:
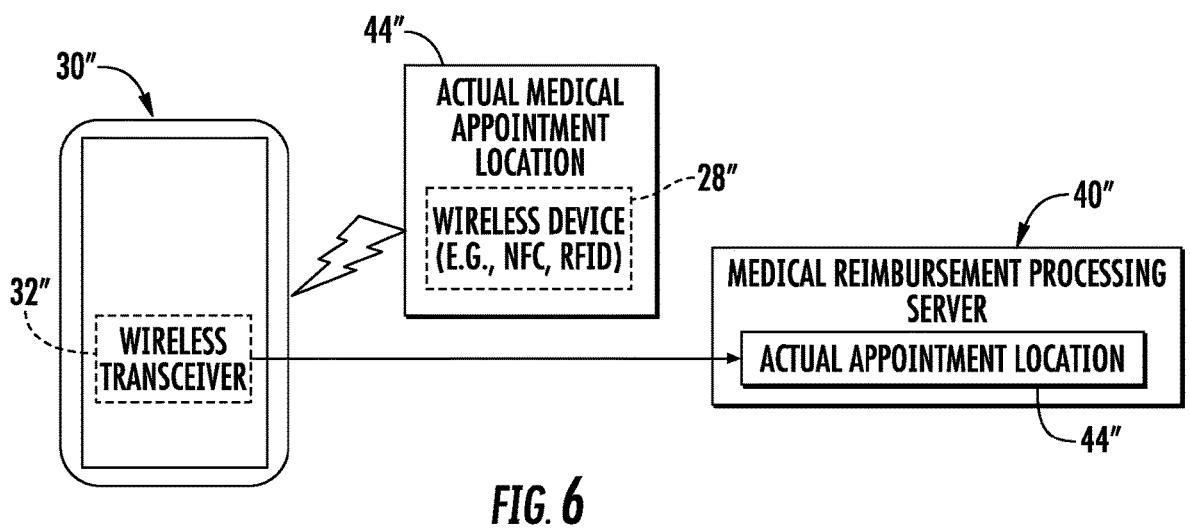
FIG. 6 is a schematic block diagram of a medical reimbursement system in accordance with an embodiment.

Referring now briefly to FIG. 6, in another embodiment, the medical reimbursement processing server 40" may obtain the actual medical appointment location data as data via the user device from a wireless device 28" at the appointment location. For example, the wireless device 28" may be an NFC tag or an RFID tag and wirelessly communicate the actual medical appointment location 44" as data via the wireless transceiver 32" of the user device 30" or associated circuitry of the user device.

A method aspect is directed to a method of processing a medical reimbursement. The method includes using a medical reimbursement processing server 40 to obtain a scheduled medical appointment location 46 and a scheduled medical appointment time 47 for the user medical appointment, and obtain the actual medical appointment location 44 and the actual medical appointment time 45 from the user device 30. The method also includes using the medical reimbursement processing server 40 to validate whether the actual medical appointment location 44 matches the scheduled medical appointment location 46 and whether the actual medical appointment time 45 matches the scheduled medical appointment time 47, and when so, determine a distance traveled 56 by the user related to the user medical appointment, calculate a travel distance reimbursement 25 for the user based upon the distance traveled, and process travel payment to the user based upon the travel distance reimbursement.

A computer readable medium aspect is directed to a non-transitory computer readable medium for processing a medical reimbursement. The non-transitory computer readable medium includes computer executable instructions that when executed by a processor 41 cause the processor to perform operations. The operations include obtaining a scheduled medical appointment location 46 and a scheduled medical appointment time 47 for a user medical appointment, and obtaining an actual medical appointment location 44 and an actual medical appointment time 45 from a user device 30. The operations further include validating whether the actual medical appointment location 44 matches the scheduled medical appointment location 46 and whether the actual medical appointment time 45 matches the scheduled medical appointment time 47, and when so, determining a distance traveled 56 by the user related to the user medical appointment, calculating a travel distance reimbursement 25 for the user based upon the distance traveled, and processing travel payment to the user based upon the travel distance reimbursement.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A medical reimbursement system comprising:
a user device associated with a user having a user identifier associated therewith, the user device configured to obtain an actual medical appointment location based upon user device global positioning system (GPS) coordinates associated with the actual medical appointment location and based upon image data associated with the actual medical appointment location, and obtain an actual medical appointment time for a user medical appointment;
a medical reimbursement processing server configured to
communicate with a remote server to obtain a scheduled medical appointment location having scheduled appointment GPS coordinates and a unique location identifier associated therewith and a scheduled medical appointment time for the user medical appointment based upon the user identifier,
obtain the actual medical appointment time from the user device,
communicate with the user device to obtain the user device GPS coordinates associated with the actual medical appointment location,
communicate with the user device to obtain the image data associated with the actual medical appointment location from the user device,
validate whether the actual medical appointment location matches the scheduled medical appointment location and whether the actual medical appointment time matches the scheduled medical appointment time by at least matching the user device and scheduled appointment GPS coordinates, determining that the image data is associated with the unique location identifier, and determining the actual appointment time to be within a threshold time of the scheduled appointment time, and when so,
determine a distance traveled by the user related to the user medical appointment,
calculate a travel distance reimbursement for the user based upon the distance traveled, and
process travel payment to the user based upon the travel distance reimbursement.

2. The medical reimbursement system of claim 1 wherein the image data is based upon a quick response (QR) code.

3. The medical reimbursement system of claim 1 wherein the medical reimbursement processing server is configured to obtain the actual medical appointment location as data via the user device and from a wireless device at the actual medical appointment location.

4. The medical reimbursement system of claim 1 wherein the medical reimbursement processing server is configured to obtain an address of the user to calculate the distance traveled by the user related to the user medical appointment.

5. The medical reimbursement system of claim 1 wherein the medical reimbursement processing server is configured to calculate the distance traveled by the user related to the user medical appointment based upon the user device GPS coordinates.

6. The medical reimbursement system of claim 1 wherein the medical reimbursement processing server is configured to obtain a medical insurance claim for the medical appointment including the scheduled medical appointment location and the scheduled medical appointment time.

7. The medical reimbursement system of claim 1 wherein the medical reimbursement processing server is configured to process travel payment by cooperating with a payment processing server.

8. The medical reimbursement system of claim 1 wherein the user device comprises a mobile wireless device comprising a housing, a wireless transceiver carried by the housing, a camera carried by the housing, a display carried by the housing, and a controller carried by the housing and coupled to the wireless transceiver, camera and display.

9. A medical reimbursement processing server comprising:
a processor and an associated memory configured to
communicate with a remote server to obtain a scheduled medical appointment location having scheduled appointment global positioning system (GPS) coordinates and a unique location identifier associated therewith and a scheduled medical appointment time for a user medical appointment based upon a user identifier associated with a user,
obtain an actual medical appointment time from a user device associated with the user,
communicate with the user device to obtain user device GPS coordinates associated with the actual medical appointment location,
communicate with the user device to obtain image data associated with the actual medical appointment location from the user device,
validate whether the actual medical appointment location matches the scheduled medical appointment location and whether the actual medical appointment time matches the scheduled medical appointment time by at least matching the user device and scheduled appointment GPS coordinates, determining that the image data is associated with the unique location identifier, and determining the actual appointment time to be within a threshold time of the scheduled appointment time, and when so,
determine a distance traveled by the user related to the user medical appointment,
calculate a travel distance reimbursement for the user based upon the distance traveled, and
process travel payment to the user based upon the travel distance reimbursement.

10. The medical reimbursement server of claim 9 wherein the image data is based upon a quick response (QR) code.

11. The medical reimbursement server of claim 9 wherein the processor is configured to obtain the actual medical appointment location as data via the user device and from a wireless device at the actual medical appointment location.

12. The medical reimbursement server of claim 9 wherein the processor is configured to obtain an address of the user to calculate the distance traveled by the user related to the user medical appointment.

13. The medical reimbursement server of claim 9 wherein the processor is configured to calculate the distance traveled by the user related to the user medical appointment based upon the user device GPS coordinates.

14. A method of processing a medical reimbursement comprising:
using a medical reimbursement processing server to
communicate with a remote server to obtain a scheduled medical appointment location having scheduled appointment global positioning system (GPS) coordinates and a unique location identifier associated therewith and a scheduled medical appointment time for a user medical appointment based upon a user identifier associated with a user, obtain an actual medical appointment time from a user device associated with the user, communicate with the user device to obtain user device GPS coordinates associated with the actual medical appointment location, communicate with the user device to obtain image data associated with the actual medical appointment location from the user device, validate whether the actual medical appointment location matches the scheduled medical appointment location and whether the actual medical appointment time matches the scheduled medical appointment time by at least matching the user device and scheduled appointment GPS coordinates, determining that the image data is associated with the unique location identifier, and determining the actual appointment time to be within a threshold time of the scheduled appointment time, and upon validation, determine a distance traveled by the user related to the user medical appointment, calculate a travel distance reimbursement for the user based upon the distance traveled, and process travel payment to the user based upon the travel distance reimbursement.

15. The method of claim 14 wherein using the medical reimbursement processing server comprises using the medical reimbursement processing server to obtain the actual medical appointment location as data via the user device and from a wireless device at the actual medical appointment location.

16. The method of claim 14 wherein using the medical reimbursement processing server comprises using the medical reimbursement processing server to calculate the distance traveled by the user related to the user medical appointment based upon the user device GPS coordinates.

17. A non-transitory computer readable medium for processing a medical reimbursement, the non-transitory computer readable medium comprising computer executable instructions that when executed by a processor cause the processor to perform operations comprising:

communicating with a remote server to obtain a scheduled medical appointment location having scheduled appointment global positioning system (GPS) coordinates and a unique location identifier associated therewith and a scheduled medical appointment time for a user medical appointment based upon a user identifier associated with a user;

obtaining an actual medical appointment time from a user device associated with the user;

communicating with the user device to obtain user device GPS coordinates associated with the actual medical appointment location;

communicating with the user device to obtain image data associated with the actual medical appointment location from the user device;

validating whether the actual medical appointment location matches the scheduled medical appointment location and whether the actual medical appointment time matches the scheduled medical appointment time by at least matching the user device and scheduled appointment GPS coordinates, determining that the image data is associated with the unique location identifier, and determining the actual appointment time to be within a threshold time of the scheduled appointment time, and when so, determining a distance traveled by the user related to the user medical appointment, calculating a travel distance reimbursement for the user based upon the distance traveled, and processing travel payment to the user based upon the travel distance reimbursement.

18. The non-transitory computer readable medium of claim 17 wherein the operations comprise obtaining the actual medical appointment location as data via the user device and from a wireless device at the actual medical appointment location.

19. The non-transitory computer readable medium of claim 17 wherein the operations comprise obtaining an address of the user to calculate the distance traveled by the user related to the user medical appointment.

20. The non-transitory computer readable medium of claim 17 wherein the operations comprise calculating the distance traveled by the user related to the user medical appointment based upon the user device GPS coordinates.

* * * * *